H. C. CLAY.
GENERATOR DRIVER.
APPLICATION FILED OCT. 19, 1910.

989,521.

Patented Apr. 11, 1911.

2 SHEETS—SHEET 1.

Witnesses
Frank A. Fahl
Thomas W. McMeans

Inventor
Harry C. Clay,
By Bradford Hood
Attorneys.

UNITED STATES PATENT OFFICE.

HARRY C. CLAY, OF COLUMBUS, INDIANA, ASSIGNOR TO REEVES & COMPANY, OF COLUMBUS, INDIANA, A CORPORATION OF INDIANA.

GENERATOR-DRIVER.

989,521.  Specification of Letters Patent.  Patented Apr. 11, 1911.

Application filed October 19, 1910. Serial No. 587,869.

*To all whom it may concern:*

Be it known that I, HARRY C. CLAY, a citizen of the United States, residing at Columbus, in the county of Bartholomew and State of Indiana, have invented a new and useful Generator-Driver, of which the following is a specification.

The object of my invention is to provide a driving connection between a power shaft and the magneto or other electric generator of such character that, irrespective of the speed of movement of the power shaft the rotor of the generator may be given, at the proper sparking time, a speed sufficient for adequate current production, the arrangement being such that, when the power shaft reaches a normal speed, the speed increasing function of the driving connection will be automatically eliminated.

The accompanying drawings illustrate my invention.

Figure 1:
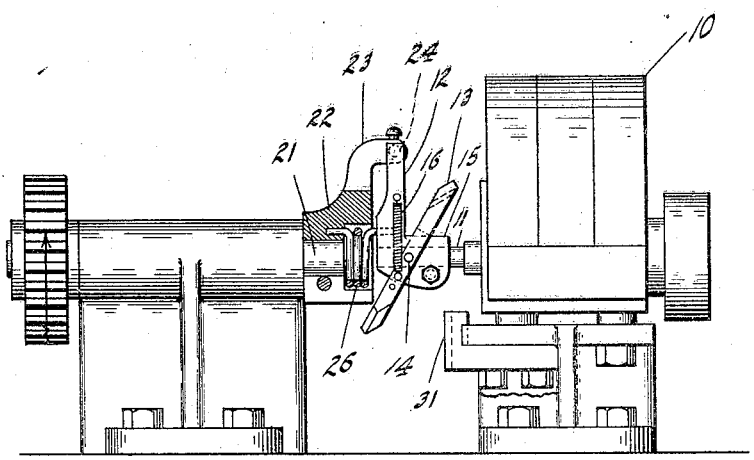
Figure 2:
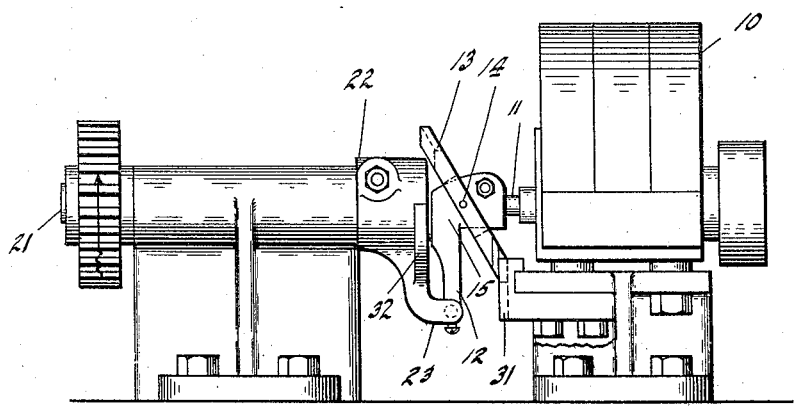
Figure 3:
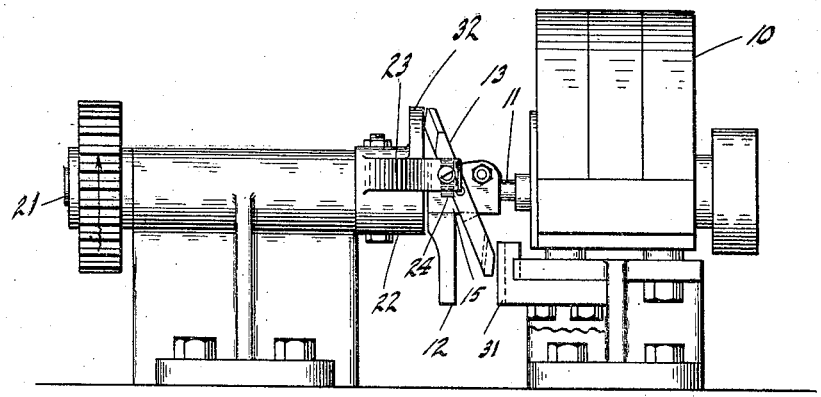
Figure 4:
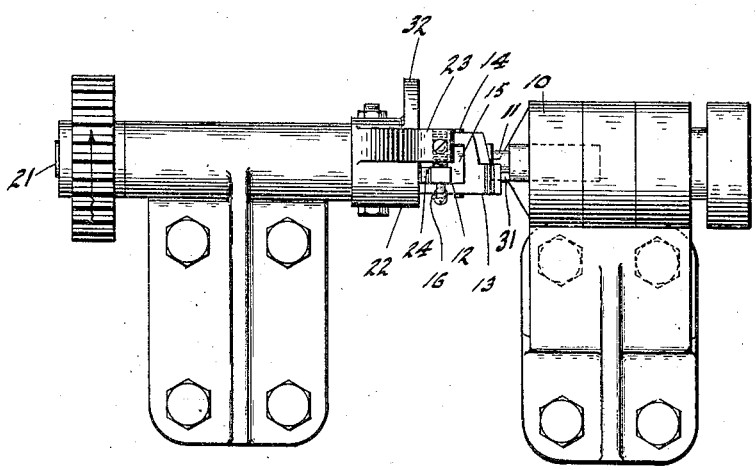

Figure 1 is a side elevation, in partial vertical section, of an embodiment of my invention with the parts at rest; Fig. 2 a similar view showing the power shaft and rotor advanced 180° at slow speed; Fig. 3 a similar view showing the parts with the power shaft further advanced and the rotor at the instant of release; Fig. 4 a plan with the parts in position shown in Fig. 1.

In the drawings, 10 indicates an electric generator of any desired type, although preferably of the magneto type, the construction preferably being such that a current of high tension may be produced at a speed of rotation of the rotor equal to the sparking speed of the engine with which the device is to be associated. The generator is provided with a rotor 11 to which I secure a radially projecting arm 12. Pivoted upon the rotor (conveniently on the hub 15 of arm 12) on an axis at right angles to the axis of the rotor, is a speed controlled governor arm 13 which, in the present embodiment of my invention, is a self-balanced arm pivoted medially at 14 upon the hub 15. A light spring 16 is connected at one end of arm 13 and at the other end to a portion secured to or formed integral with the hub 15 so that the spring serves to normally bring the arm 13 to the position shown in Fig. 1, the arm being so formed as to interengage with hub 15 or otherwise to insure a uniform positioning of the arm under the action of the spring.

Secured to the power shaft 21, which is driven at the desired speed by means of any suitable train, is a hub 22 which carries a radially projecting arm 23 which is projected into the path of movement of the arm 12 in front thereof so as to serve as an obstruction to the movement of arm 12 and consequently as an obstruction to the rotation of the rotor 11. In order to eliminate noise and shock a light buffer spring 24 may be mounted in the rear face of arm 23 to receive the impact of arm 12.

The driving connection between the power shaft 21 and the rotor 11 is a yielding one which in the present embodiment of the invention, is a coiled spring 26, one end of which is secured to the hub 22 and the other to the hub 15, the spring being under an initial tension which is sufficient to drive the rotor at full speed and is sufficient, therefore, to normally maintain arm 12 against the buffer spring 24.

Arranged in the path of movement of one arm of governor arm 13, when said arm is retained by spring 16, is a stop finger 31. Secured to or carried by hub 22 is a cam finger 32 which is adapted to engage the adjacent end of the governor arm 13 to retract it, against the action of spring 16, from the plane of the stop finger 31.

The operation is as follows: With the parts at rest spring 16 serves to draw the governor arm 13 into the position shown in Fig. 1 and when the power shaft is driven forwardly at slow speed, such as can only be attained when the engine is being started by hand, spring 26 will serve to drive the rotor at the same slow speed and will bring one end of the governor arm 13 against stop finger 31, whereupon the power shaft may continue in its movement so as to place spring 26 under still further tension. This further movement of the power shaft will continue until the cam finger 32 comes into engagement with the adjacent end of governor arm 13 and the further movement of that cam finger will serve to retract the governor arm 13 from the stop finger 31 as illustrated in Fig. 3. As soon as this has happened, the rotor 11 is free to rotate and is driven forwardly at high speed by spring 26, this rapid movement of the rotor taking place just at the time when spark production is desired, and the finger 12 coming into engagement with the buffer spring 24. By this arrangement a desired speed of movement of the rotor is obtained and the rotor catches up with the power shaft and then continues in its movement at the same speed of movement as that of the power shaft. When this speed of movement is attained, the governor arm, by reason of its medial pivotal mounting will tend to swing in a plane at right angles to the axis of the rotor against the action of spring 16 and will thereby be automatically retained out of the plane of the stop finger 31 so that said stop finger will have no further effect upon it.

Immediately upon the reduction of speed of the power shaft, however, to a point where the engine is nearly stopped, the operation already described will be repeated but no damage can result to the mechanism because when the rotor has been stopped, by reason of the engagement of arm 13 with stop finger 31, for in less than half a revolution, the cam finger 32 will again come into engagement with the governor arm and retract it from the stop finger so as to permit further forward movement of the rotor.

I claim as my invention:

1. The combination of a magneto having a driven shaft, an independent driving shaft, a spring connecting said two shafts whereby the driving force is yieldingly applied from the driving shaft to the driven shaft, a radially projecting finger attached to the driven shaft, a radially projecting finger attached to the driving shaft and overlapping the finger on the driven shaft, a spring abutment between the two fingers, a swinging governor arm carried by the driven shaft finger, a spring for normally holding said governor arm in one position, said spring being yieldable under the centrifugal action of the governor arm, a cam carried by the driving shaft finger and adapted to engage the governor arm and swing the same in the direction of movement produced by centrifugal action of said arm, and a fixed stop arranged in the circumferential path of movement of the governor arm when in the position produced by the spring attached to said governor arm.

2. The combination of a magneto having a driven shaft, an independent driving shaft, a spring connecting said two shafts whereby the driving force is yieldingly applied from the driving shaft to the driven shaft, a radially projecting finger attached to the driven shaft, a radially projecting finger attached to the driving shaft and overlapping the finger on the driven shaft, a swinging governor arm carried by the driven shaft finger, a spring for normally holding said governor arm in one position, said spring being yieldable under the centrifugal action of the governor arm, a cam carried by the driving shaft finger and adapted to engage the governor arm and swing the same in the direction of movement produced by centrifugal action of said arm, and a fixed stop arranged in the circumferential path of movement of the governor arm when in the position produced by the spring attached to said governor arm.

In witness whereof, I have hereunto set my hand and seal at Columbus, Indiana, this 13th day of October, A. D. one thousand nine hundred and ten.

HARRY C. CLAY. [L. S.]

Witnesses:
J. H. BACHTEL,
LAFE BRUCE.